United States Patent [19]

Black et al.

[11] Patent Number: 5,570,537
[45] Date of Patent: Nov. 5, 1996

[54] ELECTRONIC INSECTICIDAL CABLE

[76] Inventors: Douglas A. Black, 9141 Sioux Ct., Jonesboro, Ga. 30236; Robert A. Rowland, P.O. Box 52, Hayesville, N.C. 28904

[21] Appl. No.: 430,904

[22] Filed: Apr. 27, 1995

[51] Int. Cl.$^6$ .................... A01M 1/22; A01M 1/04
[52] U.S. Cl. .................... 43/112; 43/1; 43/113
[58] Field of Search .................... 43/1, 58, 112, 43/98; 174/113 C, 117 F; 256/10

[56] References Cited

U.S. PATENT DOCUMENTS

| | | | |
|---|---|---|---|
| 2,581,472 | 3/1948 | Dudley et al. | 174/117 F |
| 3,291,897 | 7/1966 | Bramley | 174/126 |
| 3,768,196 | 10/1973 | Iannini | 43/112 |
| 4,299,048 | 11/1981 | Bayes | 43/98 |
| 4,600,268 | 7/1986 | Spicer | 174/113 C |
| 4,728,080 | 11/1988 | Kurschner et al. | 256/10 |
| 4,861,947 | 8/1989 | Altermatt et al. | 174/117 F |
| 4,905,969 | 3/1990 | Kurschner et al. | 256/10 |
| 5,031,353 | 7/1991 | Gardiner | 43/98 |
| 5,036,166 | 9/1991 | Monopoli | 174/128.1 |
| 5,313,020 | 5/1994 | Sackett | 174/113 C |
| 5,325,624 | 5/1994 | Richardsao et al. | 43/112 |
| 5,369,909 | 12/1994 | Murphy | 43/112 |

FOREIGN PATENT DOCUMENTS

| 653698 | 3/1994 | Australia | 256/10 |
|---|---|---|---|

OTHER PUBLICATIONS

L. G. Pickens, Relative attractiveness of paired BL and BLB flourescent bulbs for house and stable flies (Diptera:Muscidae Journal of Economic Entomology, vol. 82, No. 2, pp. 535–538, 1989.

*Primary Examiner*—Joseph J. Hail, III
*Assistant Examiner*—Darren Ark
*Attorney, Agent, or Firm*—William S. Ramsey

[57] ABSTRACT

This insecticidal cable has a pair or pairs of exposed electrical conductive wire for use in a fly control apparatus. An electronic control unit provides pulsed high voltage between the parallel exposed conductive wires. Insects which contact either one or both of the pair of conductive wires are killed by destruction of the insect nervous system. The cable both supports the conductive wires and holds them with the correct separation. The apparatus is used to destroy flies in stables, poultry houses, and other structures.

12 Claims, 3 Drawing Sheets

ELECTRONIC INSECTICIDAL CABLE

BACKGROUND OF THE INVENTION

1. Field of the Invention

This invention relates to electrical conducting cable having exposed electrical conductors energized by electrical pulses which destroy flies which alight upon the cable.

2. Description of Related Art

U.S. Pat. No. 3,291,897 discloses an electrically conducting rope for electric fencing consisting of a three-ply twine, each ply consisting of a number of filaments twisted together into groups. One filament of one group in each ply is a metallic conductor, the remaining filaments are non-metallic material. In another embodiment, the plies are twisted about a core of insulating material.

U.S. Pat. No. 4,728,080 discloses an electric fence construction with conductive filaments interwoven with supporting filaments. The supporting filaments break at about the same time as the conducting filaments, facilitating the discovery of broken strands.

U.S. Pat. No. 4,905,969 discloses an electric fence construction having aluminum or aluminum alloy wire interwoven with supporting filaments or strands so that a substantial part of the wire is exposed to the outer surface of the construction.

U.S. Pat. No. 5,036,166 discloses fence wire in which highly conductive and high strength metal strands are placed in contact so that a break in highly conductive strands does not interrupt the electrical circuit. In one embodiment, a central core comprising a bunch of plastic monofilaments are encased in a plaited sheath consisting of braided plastic monofilaments and the highly conductive and high strength metal strands.

"FLY POP'R" is a trademark owned by Product Testing & Marketing Inc., P.O. Box 52, Hayesville, N.C. 28904 for its fly control system which consists of closely spaced conductive wires which are energized by electrical pulses energized by an electrical control unit. Periodic high voltage pulses in the conductive wires induce destructive currents in flies which rest on one of the conductive wires. The space between the conductive wires must be carefully maintained, and spacers are used for this purpose.

The present invention consists of cables in which the conductive wires are maintained at the desired spacing by construction in conjunction with non-conductive materials. Such cables are used with fly control systems such as the "FLY POP'R". Use of the cable of the present invention facilitates the installation of the fly control system because it avoids the need for careful and tedious stringing and spacing of conductive wires. In addition, problems of shorting out of the fly control system by accidental conduct between the conductive wires are avoided. The present invention cables are less expensive to install and more reliable in operation than the strung wires of the prior art.

SUMMARY OF THE INVENTION

U.S. Pat. No. 5,325,624, Electronic Fly Population Control Apparatus, R. H. Richardson and Hank Beesley, incorporated herein by reference, discloses an apparatus which controls the fly population within an animal or poultry enclosure.

This apparatus consists of an electronic circuit and two high voltage wires.

The electronic circuit delivers a pulse of up to 8 killovolt (KV) peak-to-peak with approximately a 1 to 100 millisecond pulse width and a pulse repetition rate of approximately 1 pulse per second to 1 pulse per 5 seconds.

The high voltage wires or conductors or conductive wires are spaced as close as 1/8" to 3/16" apart, with a preferred separation of 3/16".

The amplitude, pulse width and pulse repetition rate is selected so as to not contain enough average power to ignite any materials likely to be in the environment where the system is to be installed but contain sufficient energy in the pulse to kill the fly by damaging its nervous system.

Neither of the high voltage wires are grounded. The low power pulse appears between the two high voltage wires and is not referenced to ground. Thus, if there is inadvertent contact between a high voltage wire and anything in the building, even a metal truss, there is no voltage differential to cause an arc.

Flies (other than black flies and mosquitoes) prefer wires as roosting or resting sites.

This apparatus kills flies not by electrocution or incineration but by attacking and destroying the fly nervous system. When a fly lands on one conductor, it will draw a small charge through its body, which damages the nervous system and kills the fly.

The present invention is an insecticidal cable which replaces the parallel strung conductive wires with a cable consisting of at least two conductive wires maintained at a desired separation. The conductive wires are exposed to the surface of a substantial portion of the cable, affording a surface on which flies will land.

One objective of the present invention is to reduce by more than 80% the installation time required to install an electronic fly control apparatus.

Another objective is to provide an electronic fly control apparatus which may be easily installed by unskilled labor.

Another objective is to provide an electronic fly control apparatus which uses a minimum of installation fixtures or parts.

Another objective is to provide an electronic fly control apparatus in which there is no possibility of arcing or shorting between the conductors due to contact between one conductor and another.

Another objective is to provide an electronic fly control apparatus which minimizes the chance of shorting between the conductors due to an object touching both conductors.

Another objective is to provide an electronic fly control apparatus which is less expensive than that in the prior art.

A final objective is to provide an electronic fly control apparatus which is environmentally benign, easy to install, and effective in reducing the fly population of enclosed spaces.

DESCRIPTION OF THE PREFERRED EMBODIMENTS

The insecticidal cable of this invention is used in an insect control system for the destruction and control of flies in enclosed areas, such as barns, stables, and poultry houses. The term "flies" is used to mean noxious and pestilent members of the order Diptera and include house flies, horse flies, deer flies, stable flies, faceflies, horse bot flies, blow flies, louse flies, black flies, and mosquitoes, as well as other flies.

The insecticidal cable replaces the high voltage wires or conductors of an electronic fly population control apparatus, such as that described in U.S. Pat. No. 5,325,624, incorporated herein by reference.

Figure 1:
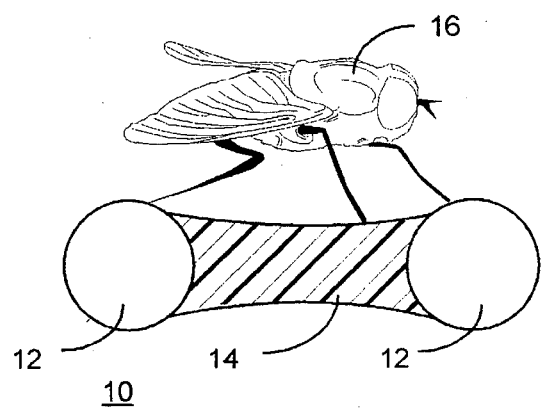
FIG. 1 is a cross section taken along line 1—1 of FIG. 2 of a first embodiment cable with a fly.
Figure 2:
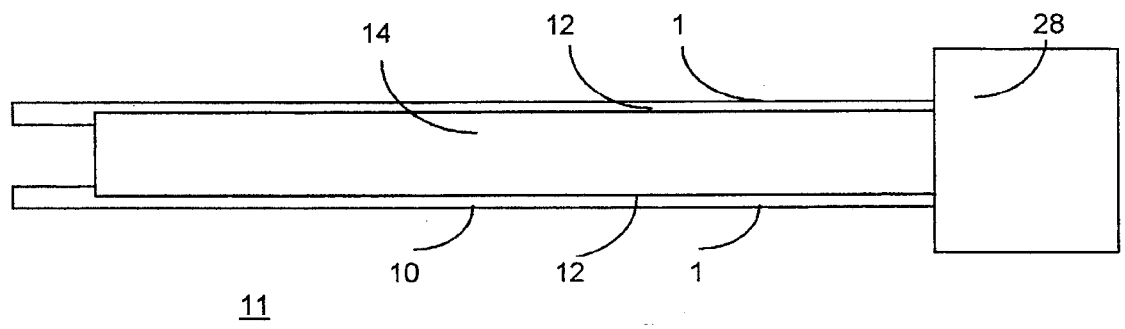
FIG. 2 is a top view of the cable of FIG. 1 and the electronic control unit.

FIG. 1 is a cross section of a first embodiment cable taken at line 1—1 of FIG. 2. The cable 10 consists of two conductive wires or conductors or high voltage wires 12, each of which are attached to a plastic web on non-conductive material 14. Each conductive wire is attached to the web on one side only, leaving approximately 260° of the cross section of the wire exposed for contact with flies. The plastic web acts as both separator and supporter for the conductive wires. The conductive wires have a diameter greater than the thickness of the plastic web. The conductive wires have a diameter of ¹⁄₁₆" to ⅛". A preferred diameter is ⅛". The distance between the conductive wires may be from ⅛" to ¼". A preferred distance between the conductive wires is ³⁄₁₆".

The conductive wires may be of any strong, resilient, flexible, conductive wire such as copper, aluminum, or steel. Stainless steel is preferred.

The plastic web may be constructed of any non-conductive, durable, flexible, plastic material, such as polypropylene, or nylon, or aramid fiber such as "KEVLAR". The product aramid fiber sold under the trademark "KEVLAR" may be used. Nylon is preferred. "KEVLAR" has the property of high heat resistance which enables it to resist deterioration from arcing, but is more expensive than many other plastics.

The conductive wire may be connected to the plastic web by any convenient manner, such as using an adhesive, or fusing the plastic to the conductive wire. It is preferred to fuse the conductive wires to the plastic web.

A house fly 16 is shown in FIG. 1 to provide perspective.

FIG. 2 is a top view of the fly control system 11 showing the first embodiment cable 10 and the electronic control unit 28. FIG. 1 is taken at line 1—1. The cable 10 is shown with conductive wires 12 connected by a plastic web 14. The electronic control unit or electronic circuit 28 is shown diagrammatically.

Figure 3:
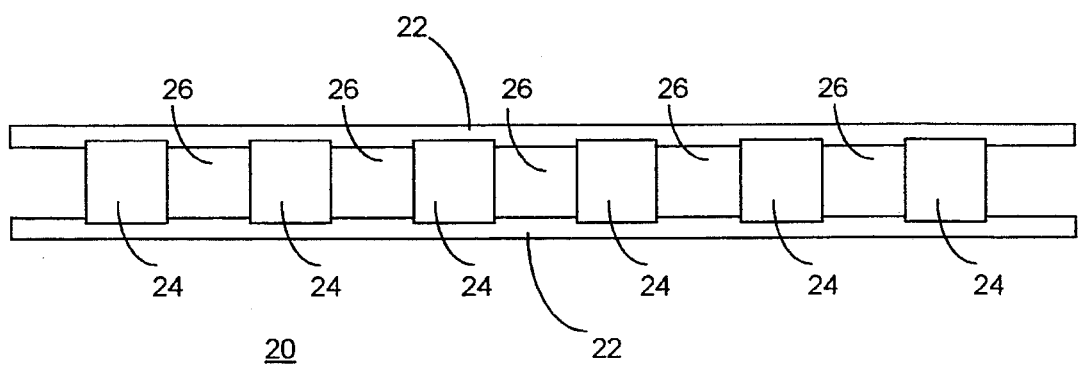
FIG. 3 is a top view of a second embodiment cable.

FIG. 3 is a top view of a second embodiment cable 20. This embodiment is identical to the first embodiment except the plastic web is not continuous along the length of the cable. The cable 20 is shown with conductive wires 22 connected by a plastic web 24. The plastic web is discontinuous, with stretches of web 24 alternating with open stretches 26 which are free of web. The stretches of web provide enough support to maintain the separation of the conductive wires in the stretches which are free of web. The cable of embodiment 2 is lighter and less expensive to manufacture than that of embodiment 1.

Figure 4:
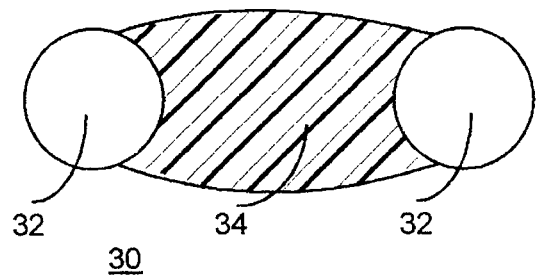
FIG. 4 is a cross section of a third embodiment cable.

FIG. 4 is a cross section of a third embodiment cable 30, which is identical to the first embodiment except that the plastic web is thicker than the conductive wires. This embodiment provides a cable of greater strength than that of the first embodiment. FIG. 4 shows a cross section of cable 30 with conductive wires 32 connected to a plastic web 34.

Figure 5:
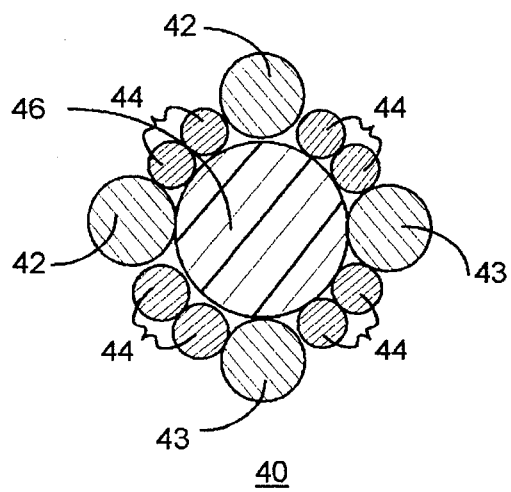
FIG. 5 is a cross section of a fourth embodiment cable.

FIG. 5 is a cross section of a fourth embodiment cable 40. In this embodiment, a core 46 is made of non-conductive material, which may be a monofilament, or a braided or woven rope. Twisted about the core are two pairs of conductive wires 42, 42, and 43, 43 and non-conductive strands 44. The non-conductive strands 44 separate the conductive wires 42, 42, and 43, 43 and prevent shorting of the conductive wires. Additional non-conductive strands (not shown) may cross the conductive wires to help hold the conductive wires in place. The non-conductive strands are preferably made of nylon or "KEVLAR" aramid fibers. The core is preferably made of nylon. The conductive wires are preferably made of stainless steel. In this embodiment the conductive wires have a diameter of approximately double that of the non-conductive strands.

Figure 6:
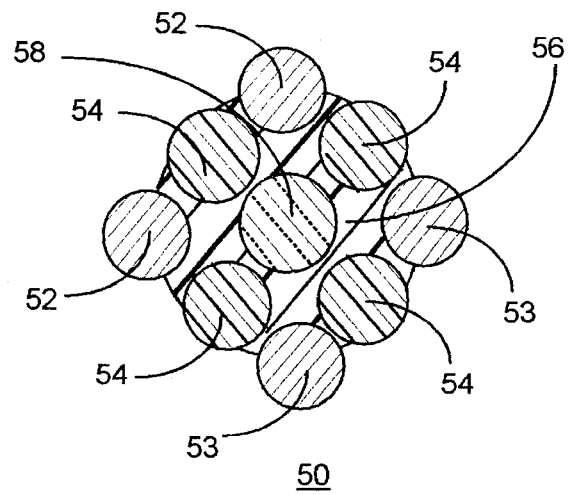
FIG. 6 is a cross section of a fifth embodiment cable.

FIG. 6 is a cross section of fifth embodiment cable 50. This embodiment is like the fourth embodiment except the core 56 is made of transparent non-conductive plastic material. In the center of the core, there is a light-conducting and light-emitting optical waveguide or fiber 58. The product light omitting optical waveguide sold under the trademark "LUMINITE" is suitable for this use. "LUMINITE" is the trademark for the light omitting optical waveguide manufactured by Lumatek Inc., Emoryville, Calif. Light is introduced at one end of the cable by a light emitting blacklight and is transmitted through the cable and is simultaneously emitted through the sides of the optical waveguide. The light is emitted through the transparent plastic material of the core 56. Non-conductive strands 54 are also made of transparent material. The non-conductive strands separate the conductive wires 52, 52 and 53, 53. In this embodiment, the non-conductive strands and conductive wires are partially embedded in the core. In this embodiment the long axes of the conductive wires and the non-conductive strands are parallel to the long axis of the core. The conductive wires and non-conductive strands may be attached to the core in any other suitable manner, such as with straps or bands.

A light-emitting optical waveguide may be included in any embodiment of this invention which contains one or more longitudinally continuous, non-conductive strands. The light-emitting optical waveguide may be substituted for any longitudinally continuous non-conductive strand or may constitute the core in any embodiment of this invention.

In the fifth embodiment of FIG. 6, blacklight is introduced into and emitted by the optical waveguide. This causes the cable to emit blacklight which is attractive to flies (Lawrence G. Pickens, Relative attractiveness of paired BL and BLB fluorescent bulbs for house and stable flies (Diptera: Muscidae), Journal of Economic Entomology, vol. 82, no. 2, pages 535–538, April 1989). In this manner, the natural attractiveness of the cable as a roost or resting place for flies is supplemented by the attractiveness of black light for such flies. The effectiveness of the cable is increased by inclusion of the blacklight as attractant. The light emitting core may be used with any embodiment of this invention which uses a core.

Figure 7:
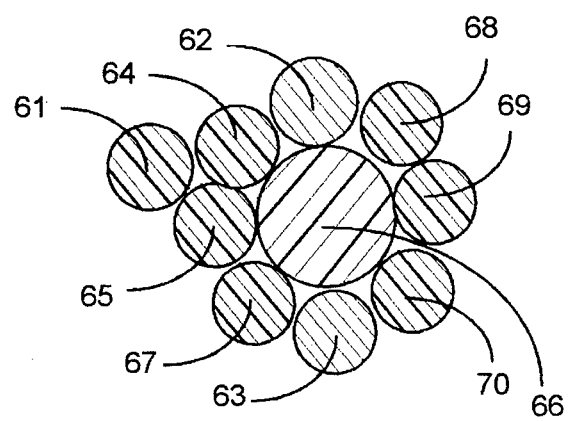
FIG. 7 is a cross section of a fourth embodiment cable at line 7—7 of FIG. 9.
Figure 9:
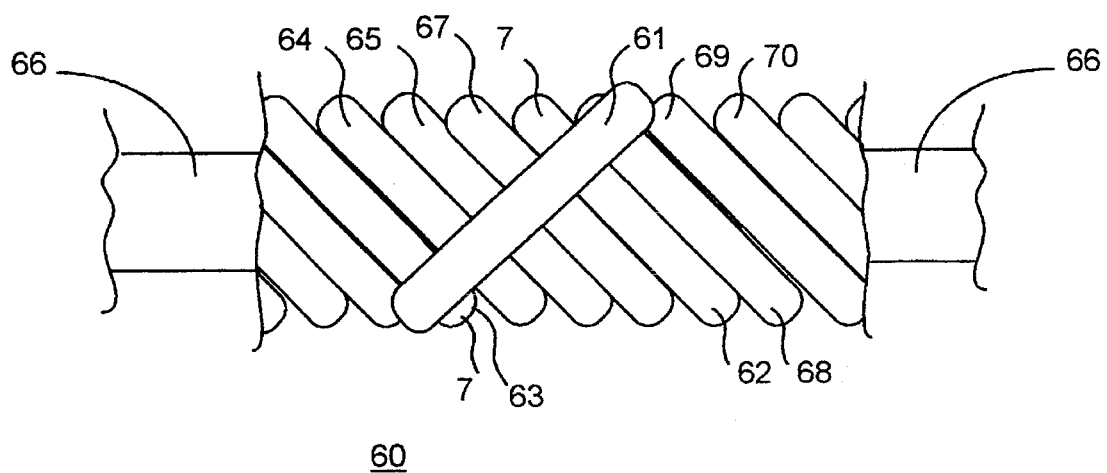
FIG. 9 is a side view of a fourth embodiment cable.

FIG. 7 is cross-section view of the sixth embodiment insecticidal cable 60 taken at line 7—7 of FIG. 9. The sixth embodiment cable 60 is like the fourth embodiment cable of FIG. 5 except that the conductive wires 62 and 63 are of the same diameter as the non-conductive strands 64, 65, 67, 68, 69, and 70. The conductive wires and non-conductive strands are twisted about a core 66. A non-conductive wrap strand 61 helps secure the conductive wires and non-conductive strands to the core.

Figure 8:
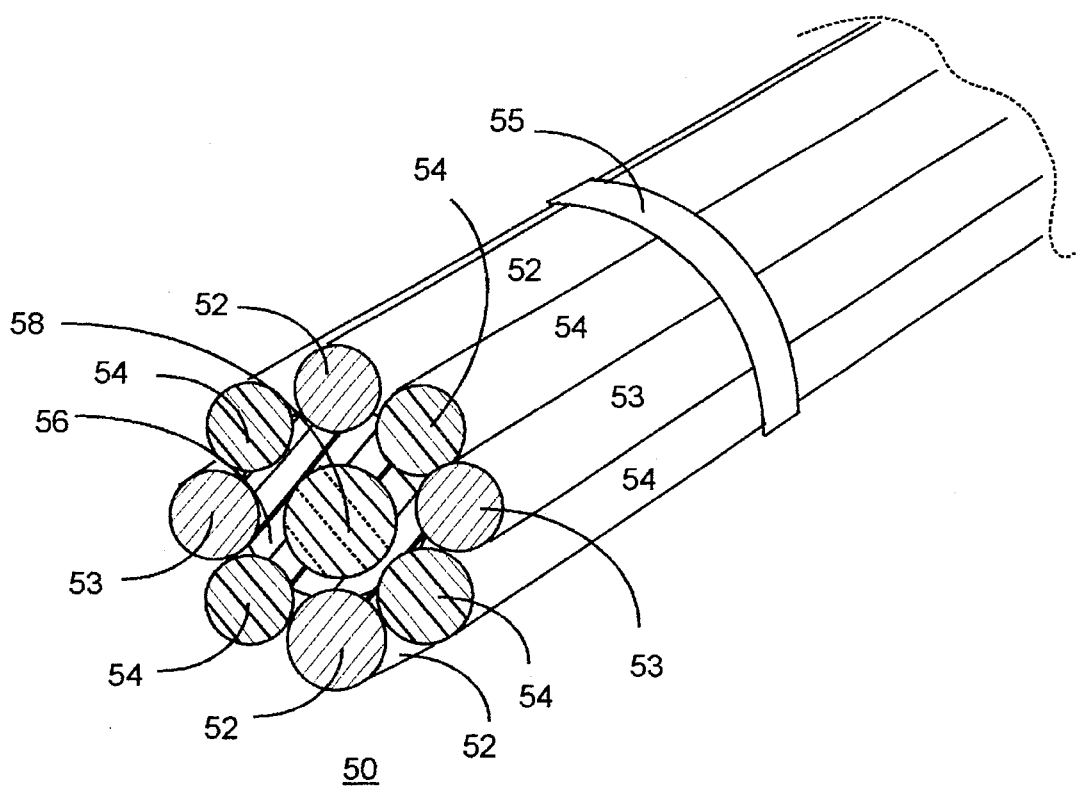
FIG. 8 is a perspective view including a cross section of a seventh embodiment cable.

FIG. 8 is a perspective view showing the end and side of the fifth embodiment cable 50 of FIG. 6. The conductive wires 52, 52, and 53, 53 surround the core 56 which contains the optical waveguide 58. The conductive wires 52 are separated by the transparent non-conductive strands 54. Strap 55 binds the cable.

FIG. 9 is a side view of the sixth embodiment cable 60. FIG. 7 is a cross section of this embodiment at line 7—7. The conductive wires 62 and 63 are seen twisted about the core 66 and separated by the non-conductive strands 64, 65, 67, 68, 69 and 70. The conductive wires and non-conductive strands may be further secured by a wrap of non-conductive strands. Non-conductive wrap strand 61 helps secure the conductive wires and non-conductive strands about the core. In this example the core is made of braided nylon strands, the conductive wires are of stainless steel, and the non-conductive strands are made of "KEVLAR" aramid fiber.

This arrangement allows conductive wires to be exposed to the surroundings on all sides, and increases the likelihood that a fly which lands on the cable will come into contact with a conductive wire and be destroyed.

EXAMPLE 1

The operation of the insecticidal cable will be described using the sixth embodiment cable described above and in FIGS. 7 and 9.

Installation and use of the cable and electronic control unit in a horse stable will be described.

The stable is prepared by removing fly roosting sites. Highest efficiency is achieved if strings, other cables, old fly paper rolls, cords, or any other similar objects suspended near the ceiling are removed.

The cable is strung near the ceiling from one rafter to another. Cable is strung in straight runs which should be no more than 2–3' apart. The cable is strung by using electric fence insulators, acting as hangers for the cord.

Power is provided by the product fly control system electronic control unit sold under the trademark "FLY POP'R". "FLY POP'R" is a trademark owned by Product Testing & Marketing Inc., P.O. Box 52, Hayesville, N.C. 28904 for its fly control system. Up to 2000' of cable is powered by the electronic control unit. The electronic control unit provides a high voltage burst of approximately 6000 volts peak-to-peak for approximately 80 milliseconds with a burst once every two seconds. The unit has an input of 115 VAC, 60 Hz, an operating environment of 0° F. to 120° F., its output current is internally limited, its output pulse is 100 millisecond (maximum), 8 $KV_{p-p}$ (maximum), its pulse repetition rate is 1 pulse per 4 seconds (maximum).

In operation, the electronic control unit is turned on and flies which land on the cable are killed even though they may be in contact with only one conductive wire. Not all flies which land on the cable are killed on first contact with the cable. Nevertheless the survivors will land on the cable again. In most cases there is an electrical arcing sound when the flies are being killed. It seems likely that a fly is killed by the transmittal of an electrical charge from one conductive wire to the other through the fly's body. When a fly is in contact with only one wire, it seems likely that the fly's body serves to reduce the resistance between the two conductive wires sufficiently to allow the transmittal of an electrical charge from one conductive wire to the other through the fly's body, thereby causing the death of the fly.

The electronic control unit should be turned off when the stalls are hosed down or water is used anywhere near the cable or electronic control unit. In periods of high humidity it may become necessary to turn off the system if arcing occurs between the conductive wires.

Combustible or flammable materials should be kept away from the cable. The system should not be used in an explosive environment.

It will be apparent to those skilled in the art that the examples and embodiments described herein are by way of illustration and not of limitation, and that other examples may be used without departing from the spirit and scope of the present invention, as set forth in the appended claims.

We claim:

1. An insecticidal cable for an insect control system in which a pulsed voltage is imposed between each member of a pair of conductive wires in order to destroy insects in contact with one conductive wire of said pair consisting of:

a core of nylon braided rope, one pair of stainless steel wire strands twisted about said rope, and six nylon strands twisted about said rope, with three nylon strands adjacent to each side of each stainless steel wire strand and separating each stainless steel strand from the other stainless steel strand.

2. An insecticidal cable for an insect control system in which a pulsed voltage is imposed between each member of a pair or pairs of conductive wires in order to destroy insects in contact with one or both conductive wires of said pair or pairs consisting of:

one or more pairs of conductive wires for having a pulsed voltage imposed between each member of the pair, non-conductive separator to maintain each member of said pair of conductive wires at a predetermined distance from and parallel to the other member of said pair of conductive wires, said non-conductive separators consisting of non-conductive strands of diameter equal to or smaller than the diameter of said conductive wires, and non-conductive supporter for supporting said pair or pairs of conductive wires, said supporter in contact with said pair or pairs of conductive wires along a substantial portion of the length of said pair or pairs of conductive wires, said non-conductive supporter consisting of a core of strong, non-conductive material which comprises a light-emitting optical cable, and said conductive wires having a substantial portion of the surface of each wire exposed to the surroundings, said pair or pairs of conductive wires and said non-conductive strands twisted about said core with at least one non-conductive strand between and separating each member of a pair of conductive wires.

3. An insect control system in which a pulsed voltage is imposed between each member of a pair or pairs of conductive wires in order to destroy insects in contact with one or both conductive wires of said pair or pairs consisting of:

one or more pairs of conductive wires for having a pulsed voltage imposed between each member of the pair, non-conductive separators consisting of non-conductive strands of diameter equal to or smaller than the diameter of said conductive wires, non-conductive supporter consisting of a core of strong, non-conductive material, said pair or pairs of conductive wires and said non-conductive strands twisted about said core with at least one non-conductive strand between and separating each member of a pair of conductive wires, said supporter in contact with said pair or pairs of conductive wires along a substantial portion of the length of said pair or pairs of conductive wires, said conductive wires having the portion of the surface of each wire which is not in contact with said non-conductive strands or with said supporter exposed to the surroundings, and an electronic control unit for imposing a pulsed voltage between each member of each pair of conductive wires at a pulse repetition rate of 1 pulse per 4 seconds (maximum).

4. The insect control system of claim 3 wherein the diameter of said conductive wire is approximately equal to the diameter of said non-conductive strands.

5. The insect control system of claim 3 wherein the diameter of said conductive wire is approximately double the diameter of said non-conductive strands.

6. The insect control system of claim 3 wherein said core is a single strand of non-conductive material.

7. The insect control of claim 3 wherein said core consists of a multiple of strands of non-conductive material which are twisted, woven or braided into a rope.

8. The insect control system of claim 3 wherein said non-conductive strands or said one or more pairs of conductive wires are partially embedded in said core.

9. An insect control system in which a pulsed voltage is imposed between each member of a pair or pairs of conductive wires in order to destroy insects in contact with one or both conductive wires of said pair or pairs consisting of:

one or more pairs of conductive wires for having a pulsed voltage imposed between each member of the pair, non-conductive separators consisting of non-conductive strands of diameter equal to or smaller than the diameter of said conductive wires, non-conductive supporter consisting of a core of strong, non-conductive material, said pair or pairs of conductive wires and said non-conductive strands arrayed about the surface of said core with the long axes of said conductive wires and non-conductive strands parallel to the long axis of said core with at least one non-conductive strand between and separating each member of a pair of conductive wires, said supporter in contact with said pair or pairs of conductive wires along a substantial portion of the length of said pair or pairs of conductive wires, said conductive wires having the portion of the surface of each wire which is not in contact with said non-conductive strands or with said supporter exposed to the surroundings, and an electronic control unit for imposing a pulsed voltage between each member of each pair of conductive wires at a pulse repetition rate of 1 pulse per 4 seconds (maximum).

10. The insect control system of claim 9 wherein said conductive wires and said non-conductive strands are adhesively attached to said core.

11. The insect control system of claim 9 wherein said conductive wires and said non-conductive strands are partially embedded in the surface of said core.

12. The insect control system of claim 9 wherein said conductive wires and said non-conductive strands are attached to said core by straps.

* * * * *